J. R. OLDHAM.
SHIP'S HATCHES AND DECKS.
APPLICATION FILED MAY 16, 1911.
1,028,263.
Patented June 4, 1912.
2 SHEETS—SHEET 1.
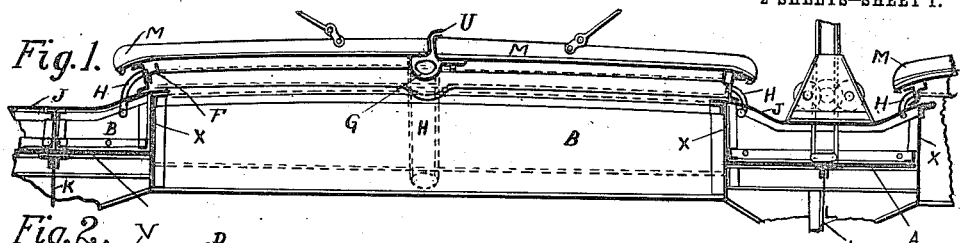
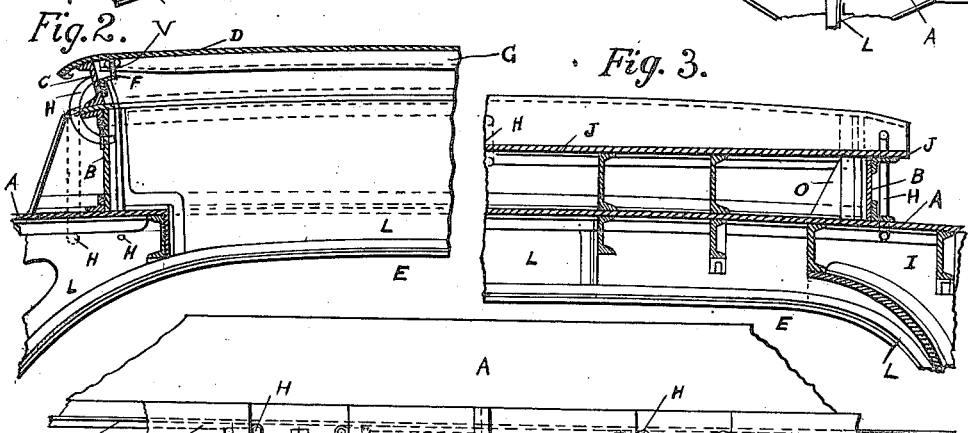
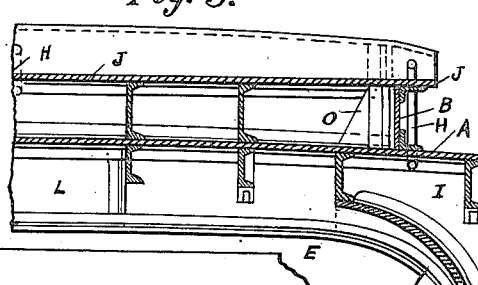
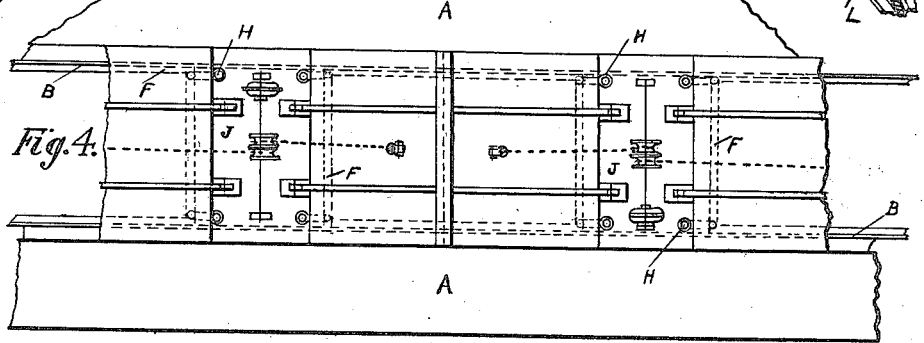
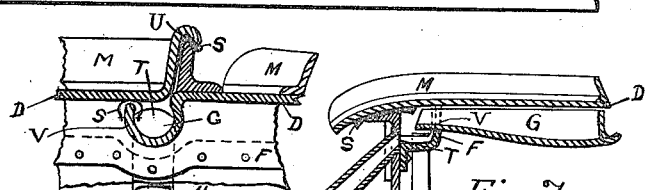
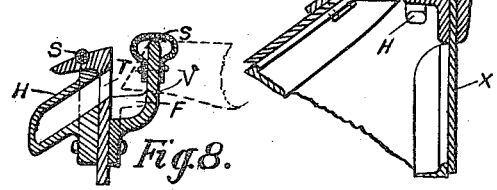
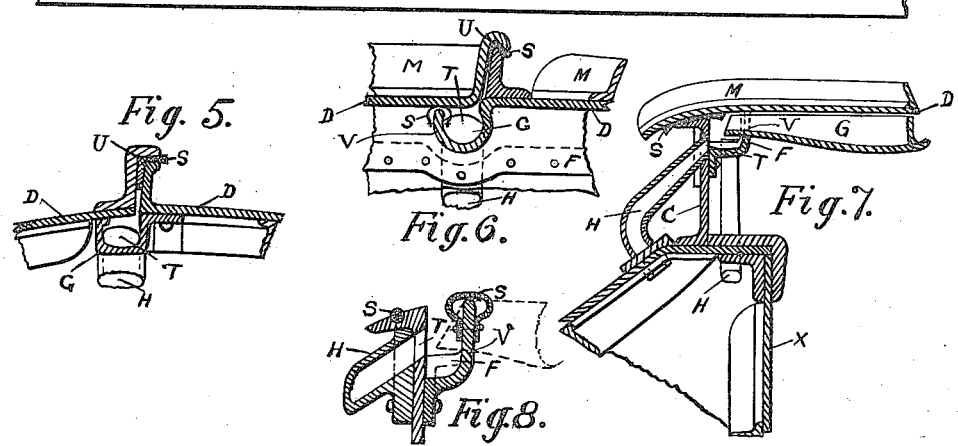
WITNESSES:
INVENTOR

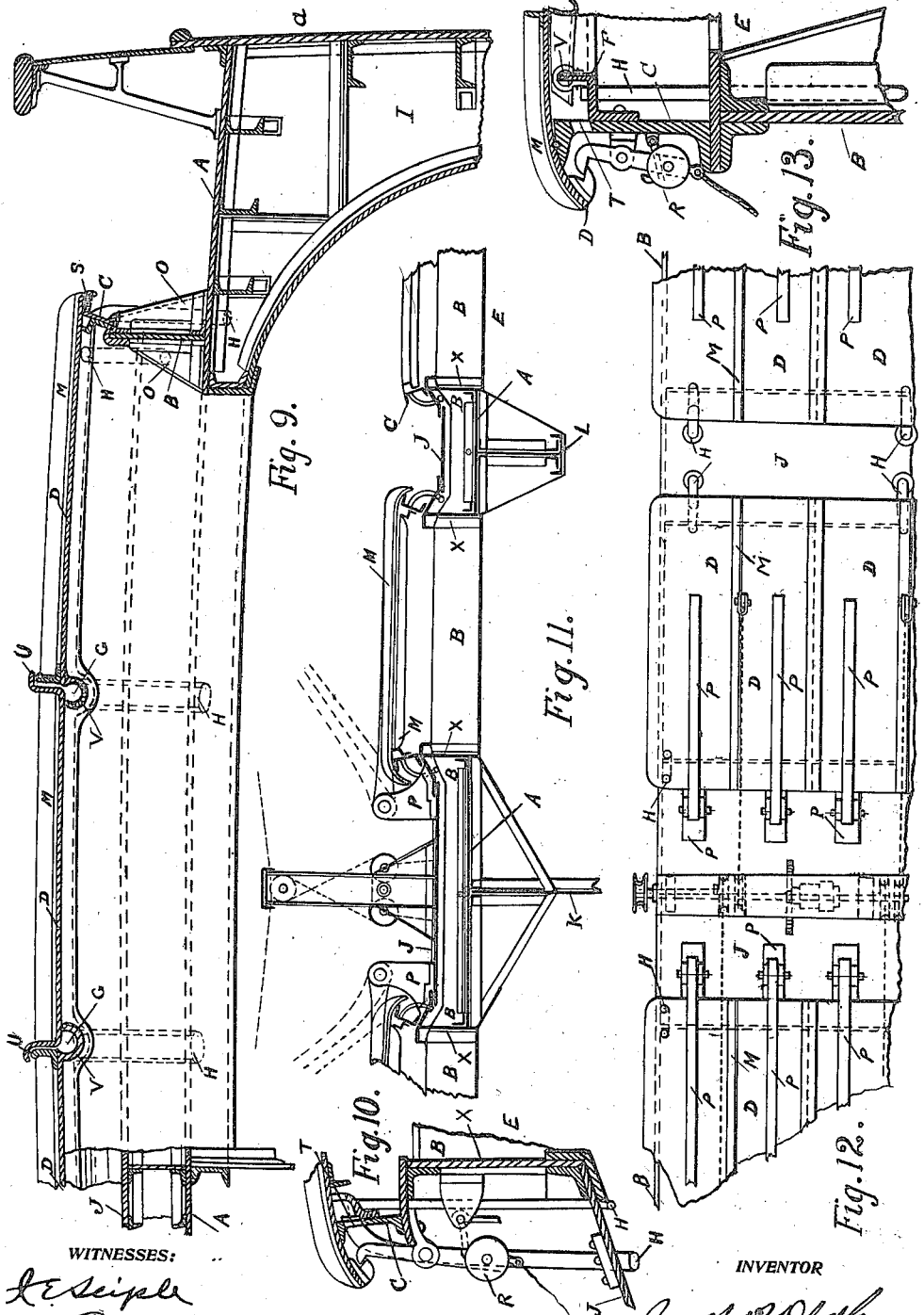

UNITED STATES PATENT OFFICE.

JOSEPH R. OLDHAM, OF CLEVELAND, OHIO.

SHIP'S HATCHES AND DECKS.

1,028,263.  Specification of Letters Patent.  Patented June 4, 1912.

Application filed May 16, 1911. Serial No. 627,614.

*To all whom it may concern:*

Be it known that I, JOSEPH R. OLDHAM, a citizen of the United States, residing at Cleveland, in the county of Cuyahoga and State of Ohio, have invented certain new and useful Improvements in Ships' Hatches and Decks, of which the following is a specification.

A modern bulk-cargo vessel can scarcely be deemed efficient if less than about half the deck surface, for the length of the cargo holds, be not cut away to provide for hatchways; and it may be said that the efficiency of this class of vessel increases almost directly as the ratio of the openings thus cut away for hatches, exceeds the area of the unperforated decks covering the holds. Such openings, or perforations, however, are a source of great weakness to the structure, and with grain or other perishable cargoes, the underwriters require the hatches to be protected by tarpaulins or canvas covers, for trans-oceanic and other trades, and even in the Great Lakes trade these are demanded. Moreover, tarpaulins are costly in materials, and in time and labor required for their handling.

The primary object therefore of my invention is to construct hatches, with their coamings, which shall be watertight and suitable for vessels when transporting grain or similar perishable cargoes, without the aid of tarpaulins or canvas covers on the hatches.
Another object of my invention is to strengthen the decks, especially abreast of the openings, or apertures therein, provided for hatchways, by supporting the decks with what I denominate sub-girder coamings extending longitudinally of the hull and of sufficient height, abreast of the hatchways, to raise the hatches to about the height of the bulwarks. These coamings are then gradually reduced in height to support a platform deck of a height above the main deck equal to about two-thirds of the sub-girder coamings at center of hatchways, and adapted for the seating and supporting of steam winches or motors and crane posts for actuating hinged hatches. This reduction of height of platform at ends of hatches will also tend to lessen the amplitude of water which could remain on the hatches in a heavy sea-way.
This invention may be said to consist in the construction and combination of elements or parts hereinafter described and definitely indicated in the claims.

In the annexed drawings Figure 1 represents a longitudinal section through a pair of hatches with a gutter beneath overlapping margins of hatches extending transversely of the hull. Fig. 2 is a fragmentary section through hatchways showing part of transverse arched girder and hatched coamings. Fig. 3 is also a fragmentary transverse section through the platform deck, between hatchways, showing the upper wing ballast chamber, transverse arched girder connection to same and drainage pipes. Fig. 4 is a fragmentary plan-view showing continuous longitudinal sub-girder coamings, hinges and actuating mechanisms on a small scale. Fig. 5 is a fragmentary section showing Z bar overlapping connection of a pair of hatches, transverse gutter, drain pipe and sheet rubber or canvas gasket between the connections. Fig. 6 is a fragmentary longitudinal section showing a gutter, gasket and drainage pipe. Fig. 7 is a fragmentary longitudinal section showing the end of gutter under adjoining margins of hatches, where it enters into the channels connected to the super-coamings, also drain pipes from the coamings and channels leading into the deck-chamber, or reservoir between the main and platform decks. Fig. 8 is a fragmentary sectional view through a super-coaming bar and channel. Fig. 9 is a fragmentary transverse section showing two hatches and part of a third hatch, knees or brackets securing the deep part of sub-girder coamings, to the decks and to the inward projection of the upper wing ballast chambers, and to the longitudinal deck frames, also drain pipes from the gutters, and channels, leading into the reservoir and upper wing ballast chambers. Fig. 10 is a fragmentary longitudinal section through the coamings, showing a novel form of gravity hook, or catch for securing the hatches on the coamings, also drain pipes leading into reservoir. Fig. 11, is a fragmentary longitudinal section through parts of three hatches, platform deck, showing rise of longitudinal sub-girder coamings in way of hatches, transverse bulkhead connections, arched girder, and a form of hatch hinges, hoisting engine and crane outlines. Fig. 12 is a plan view of the same and also view of sub-girder coamings inside of hatch margins. Fig. 13, is a fragmentary transverse section through a super-coaming, showing a channel fitted with a gasket and drain pipe to upper wing ballast chamber, fitted inside of longitudinal coamings.

Similar letters refer to similar parts throughout the several views.

A represents the main deck, or deck of the vessel. *a* the side of the vessel. B, the longitudinally extending sub-girder coamings, over which are fitted the super-coamings C.

D, indicates the hatches. E, the hatchway openings. F, the channels fastened around the inner surface of the super-coamings.

The gutters under the adjoining margins of pairs of hatches, and extending from one channel to the opposite channel, either transversely or longitudinally of the hull, are marked G.

Drain pipes from channels and gutters leading into the deck chambers, or reservoir or into the upper wing ballast chambers or tanks, are marked H. These chambers are marked I.

Platform deck, over reservoir on the main deck, between pairs of hatchways, is marked J. Transverse bulkheads K. Arched girders L. Hatch stiffening bars M. Brackets or knee plates securing the longitudinal sub-girder coamings more efficiently to the decks and to the upper wing ballast chambers O. Hatch hinges P. Gravity hooks or fasteners R. Gaskets S.

In this device each hatchway will be closed by two or more hatches, or "hatch covers," With hatchways of comparatively large dimensions extending longitudinally and narrow transversely of the hull, two hatches will usually suffice. With hatchways of comparatively large dimensions extending transversely of the hull, I prefer to adopt three hatches to inclose each hatchway. In either construction the hatches extend outside or beyond the coamings, and have their outer margins curved in a downward direction over the super-coamings, which are outwardly inclined or constructed with a closing bevel adapted for the reception of the hatches when closed thereon. The super-coamings are equipped on their inside with channels, preferably formed of Z bars, all around their inner, upper surface, but castings may be used in the construction of these channels as well as for the gutters. The province of these channels and gutters is to receive any leakage which might, through severe straining, injury or negligence, percolate through between the top of the super-coamings and the under side of the hatches, or between the margins of adjoining hatches; such leakage, however, would then be drained by the scupper holes T, in the supercoamings, into the drainage pipes connected to them, or to the underside of the channels direct, which would convey such water leakage into the deck chambers, or reservoirs, or into the upper wing ballast chambers, and thence into the bilges or overboard. One pipe about two or three inches in diameter, placed near each corner of the super coamings, and opposite the ends of the gutters, or directly below them, in the bottoms of channels, will usually be sufficient to drain off any leakage into the deck chambers or into the wing ballast chambers. By draining the sweat or leakage into these compartments, seas, which flood the decks, could not flow up the pipes and into the channels and holds, as would be the case did these water drain pipes deliver water direct onto an exposed main or weather deck. Between the super-coamings, the hatches with their upwardly turned or flanged inner margins, will overlap each other for about an inch or two either in an athwartships or fore and aft direction, according to the arrangement of the dimensions of hatches. These connections, or joints U, are formed above the gutters G, which may be tapered upwardly at their ends and the channels are also extended downwardly abreast the ends of gutters so as to form a deeper well, by castings or forgings, abreast the ends of gutters marked V. Two gutters may sometimes be fitted under the margins of one hatch. These drain pipes are protected by knees or brackets near to the mid-length of the hatchways, these strengthen the deep part of the sub-girder coamings and more securely attach them to the decks, over the inward projection of the upper wing ballast chambers and to the longitudinal deck frames W. With narrow hatchways in an athwartships direction having outwardly inclined super-coamings, the inner side of the upper wing ballast tank connection to the main deck, may be directly under, and be attached to the sub-coamings and to the longitudinal deck frame members, below the deck. The hatches will have a suitable upward camber to prevent water lodging thereon. They will be constructed of steel, or aluminum, or of other suitable metal stiffened by angle or other suitable section of bar, to make them fully as strong as the decks. The channels will strengthen the super-coamings and compensate for the drainage, or scupper-holes cut therein. When the upper wing ballast chambers are quite full of water the drainage from the hatches conveyed by the gutters, can flow along the channels, riveted inside of the super-coamings, and be drained by the pipes into the deck chambers, or reservoir below the platform deck. With the novel arrangement of overlapping, the upwardly extended margins of adjoining hatches over the gutters, and the downwardly curved outer margins over the channels and over the inclined or beveled super-coamings, it is believed that these hatches, while uninjured and under normal conditions at sea, will be perfectly watertight, but in anticipation of the hatches being strained or injured, I have adopted several forms of soft joints, made of rubber or canvas, or other suitable material, and all, or any of these gaskets may be used to insure perfect watertightness during very severe weather when the hull is loaded with a dry and perishable cargo.

The hatchways and decks are strengthened and supported by continuous longitudinal sub-girder-coamings extending over the holds and sufficiently forward and aft toward the stem and stern post to form an efficient scarf into the bow and stern. These girder coamings rise from a lower level between the hatchways, on diagonal or curved lines in a fore and aft direction, to a higher level abreast of the hatchways, so as to strengthen the hull at that part and also to raise the hatches farther from the decks and provide a freer fall for the water from the tops of the hatches and through the drain pipes. As the girder coamings rise up toward the center of hatchways on a diagonal or curved line the continuity of these elements as longitudinal strengthening members will not be broken, and as the transverse sub-coamings $x$, partake of this augmented height, increased transverse strength toward the middle line of hull is also secured for a given depth of clear hold. Upon the lower level of these sub-girder coamings is constructed a platform deck between pairs of hatchways, this covered in space, over the main deck, forms a reservoir or tank, and which I call a deck chamber, will receive any drainage from the hatch channels, and at the same time will prevent seas washing up the drain pipes, as would be the case if drained onto an exposed main deck. This platform, between hatchways, being much lower than the hatches, will also be more convenient for placing and operating the hatch hoisting engines and derricks, with cross-bars, seated thereon.

My super-coamings are shown outwardly inclined from the centers of hatchways so as to more effectually keep water from percolating through between the hatch and the coamings, when no gaskets are fitted, and also to keep the channels, on the inside of the coamings, farther away from the center of hatches so that they may not be injured by the handling of cargo. But these results may be equally well attained by fitting the super-coamings still farther outside of the sub-coamings and placing them vertically, when the top flange will have a closing bevel downward. These coamings may frequently be thus formed.

The hatches will be equipped with hinges placed longitudinally so that they can be raised and lowered on and off the super-coamings in a fore and aft direction, whether the gutters extend over the hatchways in a longitudinal or transverse direction. The hinges are attached either to the diagonal or flat portion of the platform deck and will be of sufficient height and strength to properly move the hatches, with the gutters attached, off the high portion of coaming when operated by a wire rope or chain actuated by a steam winch or other suitable motor. The raising and lowering ropes or chains will pass from the motor over sheaves at the upper ends of strong derrick posts or cranes, preferably secured on the platform deck.

Fastened to the super-coamings are what I term automatic gravity-hooks or catches, which will automatically engage with a suitable catch on the under side of the outer margins of the hatches as they are lowered onto the coamings, these will hold the hatches securely on the coamings, and for large hatchways about a dozen of these hooks and catches will be fitted. A slight pull by a lanyard, or lever, will be sufficient to disengage these catches before beginning to hoist the hatches. A pall or hook is also provided to keep the gravity hooks disengaged before starting the hoisting mechanisms.

When a hatchway is covered or inclosed by only two hatches, one of them will be equipped with a gutter. When a hatchway is covered by three hatches, the central hatch may be equipped with two gutters under its margins and the other hatches will then close down over, or on top of these. In other arrangements, two gutters may be attached to the margins of alternate hatches when the hatch between them will close down over the gutters attached to the margins of the under hatches.

Shallow and weak hatch coamings and hatches have caused more founderings of ships than any other weak element in the structure of the hull, and the losses in damaged cargoes through defective or insecurely fastened tarpaulins or "canvas covers" is one of the most frequent sources of loss in vessels engaged in the ocean trade. If hatches could be raised to a great height above the decks, seas would but rarely pass through them when well battened down; but only a limited height of coamings is practicable for a general trade; that height may be the same as the bulwarks, provided it be reduced between the hatchways.

My sub-girder coamings will be about as strong as the stringer or shelf-plates to which they are attached, and to further stiffen and secure them, at their maximum depth, and at the weakest part of the decks, near the middle of the length of the hatchways, strong brackets or knee plates, may be fitted which will, at least tend, to make the decks as strong abreast of hatchways as between them.

Decks, hatch coamings, and hatches constructed as described will be found very efficient, and when the hatches are properly closed water cannot enter the holds through the hatchways.

I do not wish to be limited as to details of construction, as these may be modified in many particulars without departing from the spirit of my invention.

Having thus described my invention, what I claim as new, and wish to secure by Letters Patent, is—

1. In a ship or vessel, the combination of a plurality of cambered metal hatches constructed of plates and stiffened inside of external or outer margins by angles or other bars, with outer margins curved down adapted to rest on, and to be secured to, outwardly inclined super-coamings having water drainage channels around their inner surface, the adjoining margins of hatches being upwardly turned, the upward projection of one hatch slightly overlapping the upward projection of the adjoining hatch, which is constructed with a gutter on the under side of adjoining margins extending transversely across the hatches, from within the channel on one side of the hatchway, to within the channel on the opposite side of the hatchway; and adapted to drain any leakage into wing ballast chambers through drain-pipes; hinges secured to the diagonal part of platform or reservoir deck and to the hatches so that they may be raised and lowered in a fore and aft direction, substantially as described.

2. In a ship or vessel, the combination of a plurality of cambered metal hatches, constructed of plates and stiffened inside of external margins by angle bars with said margins curved down and adapted to rest on, and be secured to the outward, downwardly beveled flange, of super-coamings, formed of channel bars having water drainage channels around their inner surface, the adjoining, or inner, margins of hatches being upwardly turned with the upward projection of one hatch overlapping the upward projection of the adjoining hatch, which is constructed with a gutter on the under side of the adjoining margin extending longitudinally the hatches, from within the channel on the fore side of the super coamings to within the channel on the aft side of the super coamings and adapted to drain any leakage through scupper holes and drain pipes into the reservoir or platform deck chamber, hinges secured to the reservoir deck and to the hatches, between the gutter and the channels to raise said hatches in a fore and aft direction, all substantially as set forth.

3. In ship construction, the combination of a pair, or pairs, of metal hatches with inner-adjoining-margins upwardly flanged, one flange of each pair of hatches having a slight projection adapted to cover the joint of said upwardly turned margins, the fellow hatch margin being constructed with a gutter below said flanges adapted to receive any leakage between said margins and to convey the water into drain pipes leading from around super-coamings, into wing ballast tanks or deck chambers between hatchways; outer margins of hatches downwardly curved and adapted to be seated on outwardly inclined or beveled super-coamings, said hatches being fitted with hinges attached to a platform deck to facilitate the raising and lowering of hatches when actuated by tackles, substantially as set forth.

4. In a vessel or ship, the combination of a plurality of metal hatches having outer margins downwardly curved over downwardly beveled super-coamings, fitted with water drainage channels around their inner, upper surface, with inner-adjoining-margins having upwardly turned flanges, one flange being higher and overlapping the other flange; the margin having the lower flange being constructed with a gutter under the adjoining margins of hatches, spanning the hatchway from within one drainage channel to within the drainage channel on the opposite side, substantially as set forth.

5. In a ship or other vessel, the combination of hatches in two or more units to each hatchway, constructed of steel plates and bars upwardly dished toward the center, having inner-adjoining-margins upwardly turned, one margin overlapping the adjoining margin which is constructed with a gutter beneath the joints of said margins extending across the hatchway from the water drainage channel connected to the super-coamings, on one side of the hatchway to the opposite side, the outer margins of hatches being curved down over outwardly inclined super-coamings connected to continuous longitudinal girder coamings which are reduced in height to support a platform deck between the hatchways, the hatches being adapted for draining leakage or sweat into the gutter, or channels, equipped with drain pipes leading into the wing ballast-tanks and deck chambers, knee plates secured to deck stringer plates and to sub-girder coamings abreast of hatchways, hinges and hoisting gear for hatches, all substantially as set forth.

6. In a bulk cargo vessel, the combination of large hatchways adapted to be closed by hatches in two parts having their outward margins curved down over downwardly inclined flanges of super-coamings secured on sub-girder coamings gradually deepened abreast of hatches from the reduced height of a platform deck, between pairs of hatchways, drainage channels riveted inside of said super coamings and adapted for the reception of the portable gutter under the upwardly turned joints of adjoining hatches, drainage holes and pipes adapted to drain any leakage, which could percolate through the hatch connections, into wing ballast chambers, and through the platform deck into the reservoir, substantially as set forth.

7. In a bulk cargo vessel, a combination of continuous, longitudinal sub-girder coamings extending over all the holds, and sufficiently into the bow and stern to secure an efficient scarf, rising from a lower level between hatchways, on curved lines, to a higher level abreast of hatch-ways, with a platform deck on the lower level forming, with the main deck and transverse coamings, a reservoir to receive drainage from hatches, and adapted for seating the hatch operating mechanisms; metal hatches with outer margins curved down and adapted to be seated on outwardly inclined super-coamings having channels, with drainage perforations, around the inner surface; inner, adjoining margins of hatches, upwardly turned and formed with an over-lapping flange, with a gutter extending along parallel lines below; drainage pipes leading from the channels, and gutter, into the reservoir and into the wing ballast tanks; coaming brackets abreast of hatches which are fitted with hinges and adapted for the connection of operating mechanisms all substantially as set forth.

8. In a steel vessel, the combination of transverse and longitudinal sub-girder coamings embracing the holds from bow to stern, and of sufficient height to raise the hatches on a level with the bulwarks, and reduced in height along diagonal lines to a lower level, between hatch-ways, adapted to form a platform deck, and reservoir, above the main deck; downwardly beveled super-coamings, perforated and fitted with water drainage channels and pipes, and adapted for seating metal hatches having downwardly curved outer margins, and upwardly turned, and flanged, inner margins, having gutters beneath, with the ends adapted for seating in the deepened portions of channels, when the hatches are closed; hinges secured at the diagonal turn of the platform deck and to the hatches, between the drainage channels and the gutters, and adapted for hoisting and lowering the hatches, in a fore and aft direction, when actuated by suitable mechanisms, all substantially as described and set forth.

9. In a vessel having a large hatchway, the combination of longitudinal sub-girder coamings extending over the hold and an appropriate distance beyond toward the stem and stern-post, with transverse coamings extending above the main deck to about the height of average bulwarks, said longitudinal sub-girder coamings being gradually reduced in height beyond the hatchway, to form a reservoir and platform deck; outwardly inclined super-coamings on top of longitudinal sub-girder and transverse coamings, cambered metal hatches having downwardly curved outer, transverse, and longitudinal margins, adapted to be seated on the super-coamings, and having upwardly turned inner margins, with a gutter below, with its ends adapted to be seated in the perforated fixed channels under the outer margins of hatches, drain pipes into wings and deck-chambers, hinges and operating, and fastening mechanisms, all substantially as set forth.

10. In a navigable vessel, the combination of pairs of metal hatches, having upwardly turned adjoining margins intermediate the hatch coamings, with one margin slightly overlapping the adjoining margin, with a gutter beneath these margins secured below the under lapping margin and adapted to be seated in the channels around the inner surface of the hatch-coamings, outer margins of hatches curved down over the outside flanges of the transverse and longitudinal coamings, drain pipes, hinges, hoisting and lowering and securing mechanisms all substantially as set forth.

11. In a ship or vessel having large hatchways and high coamings a plurality of cambered metal hatches constructed of plates and stiffened inside of the external or outer margins by angles or other suitable bars with outer margins curved down; the adjoining margins of hatches being upwardly turned, the upward projection of one hatch slightly over-lapping the upward projection of the adjoining hatch which is constructed with a gutter on the underside of the adjoining margins extending across the hatches to drain off any leakage, substantially as and for the purpose specified.

In testimony whereof I have hereunto set my hand in presence of two subscribing witnesses.

JOSEPH R. OLDHAM.

Witnesses:
J. E. SEIPLE,
WM. REUTENER.